US009195641B1

(12) United States Patent
Fisher et al.

(10) Patent No.: US 9,195,641 B1
(45) Date of Patent: *Nov. 24, 2015

(54) METHOD AND APPARATUS OF PROCESSING USER TEXT INPUT INFORMATION

(71) Applicant: West Corporation, Omaha, NE (US)

(72) Inventors: Aaron Scott Fisher, Omaha, NE (US); Bruce Pollock, Omaha, NE (US); Silke Witt-ehsani, Sunnyvale, CA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,483

(22) Filed: Feb. 2, 2015

Related U.S. Application Data

(63) Continuation of application No. 13/175,126, filed on Jul. 1, 2011, now Pat. No. 8,954,317.

(51) Int. Cl.
| | | |
|---|---|---|
| *G06F 17/27* | (2006.01) | |
| *H04W 4/12* | (2009.01) | |
| *G06F 17/21* | (2006.01) | |
| *G06F 3/16* | (2006.01) | |
| *G06F 17/20* | (2006.01) | |
| *G06F 17/28* | (2006.01) | |
| *G06Q 10/00* | (2012.01) | |
| *G06Q 30/00* | (2012.01) | |
| *G06Q 40/00* | (2012.01) | |
| *G10L 21/00* | (2013.01) | |
| *G10L 15/00* | (2013.01) | |
| *H04M 1/64* | (2006.01) | |
| *H04N 7/14* | (2006.01) | |
| *H04W 4/00* | (2009.01) | |
| *H04W 24/00* | (2009.01) | |

(52) U.S. Cl.
CPC ............ *G06F 17/2705* (2013.01); *G06F 17/21* (2013.01); *H04W 4/12* (2013.01)

(58) Field of Classification Search
USPC ............ 704/9, 8, 5, 235, 273; 705/5, 44, 347; 379/88.09; 455/466, 456.3; 348/14.08
See application file for complete search history.

(56) References Cited

U.S. PATENT DOCUMENTS

| | | | |
|---|---|---|---|
| 6,731,307 B1 * | 5/2004 | Strubbe et al. ................ | 715/727 |
| 7,013,263 B1 | 3/2006 | Isaka et al. | |
| 7,330,812 B2 | 2/2008 | Ding | |
| 7,599,475 B2 | 10/2009 | Eilam et al. | |

(Continued)

OTHER PUBLICATIONS

Lee et al., (hereinafter Lee) "Toward Detecting Emotions in Spoken Dialogs" IEEE Transactions On Speech And Audio Processing, vol. 13, No. 2, Mar. 2005.

*Primary Examiner* — Pierre-Louis Desir
*Assistant Examiner* — Neeraj Sharma
(74) *Attorney, Agent, or Firm* — Raffi Gostanian

(57) ABSTRACT

A method and apparatus of processing communications with a mobile station are disclosed. One example method may include receiving a message from the mobile station and processing the message by parsing the message and performing a natural language interpretation of the message and processing the parsed message to determine the user's requested objective. In response, the method may further provide generating a response to the message based on the user's requested objective and sending the response to the mobile station acknowledging the user's requested objective. Live agents may be notified to check the status of a message and continually override automated message responses to ensure the integrity of the responses.

20 Claims, 6 Drawing Sheets

(56) References Cited

U.S. PATENT DOCUMENTS

| | | |
|---|---|---|
| 7,783,487 B2 | 8/2010 | Inoue et al. |
| 8,224,650 B2 | 7/2012 | Galanes et al. |
| 8,337,208 B1 | 12/2012 | Thirumalainambi et al. |
| 8,515,739 B2 | 8/2013 | Godbole et al. |
| 8,670,018 B2 | 3/2014 | Cunnington et al. |
| 8,775,186 B2 * | 7/2014 | Shin et al. ............... 704/270.1 |
| 2006/0053107 A1 * | 3/2006 | Stuart ............................ 707/4 |
| 2006/0069545 A1 * | 3/2006 | Wu et al. ........................ 704/8 |
| 2006/0122834 A1 * | 6/2006 | Bennett ...................... 704/256 |
| 2007/0167178 A1 | 7/2007 | Al-Harbi |
| 2008/0040110 A1 * | 2/2008 | Pereg et al. ................ 704/236 |
| 2008/0154609 A1 | 6/2008 | Wasserblat et al. |
| 2009/0292533 A1 * | 11/2009 | Ryan et al. .................. 704/214 |
| 2010/0063880 A1 * | 3/2010 | Atsmon et al. ............ 705/14.53 |
| 2010/0262440 A1 * | 10/2010 | Ulring ............................ 705/5 |
| 2011/0093272 A1 * | 4/2011 | Isobe et al. ................. 704/258 |
| 2011/0106721 A1 * | 5/2011 | Nickerson et al. .......... 705/347 |
| 2011/0178803 A1 * | 7/2011 | Petrushin ................... 704/270 |
| 2011/0288897 A1 * | 11/2011 | Erhart et al. ................ 705/7.13 |
| 2012/0054102 A1 | 3/2012 | Schwartz et al. |
| 2012/0151359 A1 * | 6/2012 | Mysen et al. ............... 715/736 |
| 2012/0218127 A1 | 8/2012 | Kroen |
| 2012/0265528 A1 | 10/2012 | Gruber et al. |
| 2012/0270567 A1 * | 10/2012 | Johnson .................... 455/456.3 |
| 2012/0278064 A1 * | 11/2012 | Leary et al. .................... 704/9 |
| 2012/0278073 A1 * | 11/2012 | Weider et al. ............... 704/235 |

* cited by examiner

METHOD AND APPARATUS OF PROCESSING USER TEXT INPUT INFORMATION

CROSS-REFERENCE TO RELATED APPLICATIONS

This application is a continuation from U.S. patent application Ser. No. 13/175,126, filed Jul. 1, 2011, and entitled "METHOD AND APPARATUS OF PROCESSING USER TEXT INPUT INFORMATION", which is incorporated by reference herein in its entirety.

TECHNICAL FIELD OF THE INVENTION

This invention relates to a method and apparatus of processing input information, such as free format and/or unconstrained information, and, more particularly, to providing service based information processing and analysis of the input information.

BACKGROUND OF THE INVENTION

Consumers seek to maximize the use of their time. Electronic devices such as personal digital assistants (PDAs) mobile telephones and other Internet connectivity devices ("mobile stations") provide users with mobile access to information resources. For instance, a user may be traveling along a highway, waiting for a train or plane, etc., and may be able to communicate with online resources, institutions, and other users at the click of a button.

The growing number of mobile devices and increased use of text-based messaging in society (e.g., short messaging service (SMS), instant messaging (IM) chat, etc.) and the decreased use of voice to conduct transactions, creates an increased demand to provide text-based services. For example, users need to perform increasingly efficient and effective text-based transactions between consumers and automated communication systems, such as, contact centers and contact center agents. Also, contact centers need to increase their own productivity. Natural language processing and word parsing technology makes it easier for a call center agent to handle multiple transactions at one time.

In addition to the increased availability of a mobile station, certain communication protocols and procedures are becoming increasingly popular and easy to implement, such as, text messaging, which may use short messaging service (SMS), multimedia messaging service (MMS), instant messaging (IM) and/or any other free format text application. However, performing substantive and important transactions, such as, transferring money, paying bills, etc., requires some level of authentication and preauthorization.

SUMMARY OF THE INVENTION

One embodiment of the present invention may include a method of processing a message from a mobile station. The method may include receiving the message from the mobile station and parsing the message and performing a natural language interpretation of the message. The method may also include processing the parsed message to determine the user's requested objective and generating a response to the message based on the user's requested objective. The method may also include sending the response to the mobile station acknowledging the user's requested objective.

Another example embodiment of the present invention may include an apparatus configured to process a message from a mobile station. The apparatus may include a receiver configured to receive the message from the mobile station and a processor configured to parse the message, perform a natural language interpretation of the message, process the parsed message to determine the user's requested objective, and generate a response to the message based on the user's requested objective. The apparatus may also include a transmitter configured to send the response to the mobile station acknowledging the user's requested objective.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention include a natural language (NL) parsing system that derives interpretation out of a text string. For instance, the parsing system may determine the most appropriate response to a text string, then respond to the text string in accordance with a particular transaction type that a customer is attempting to perform.

Figure 1:
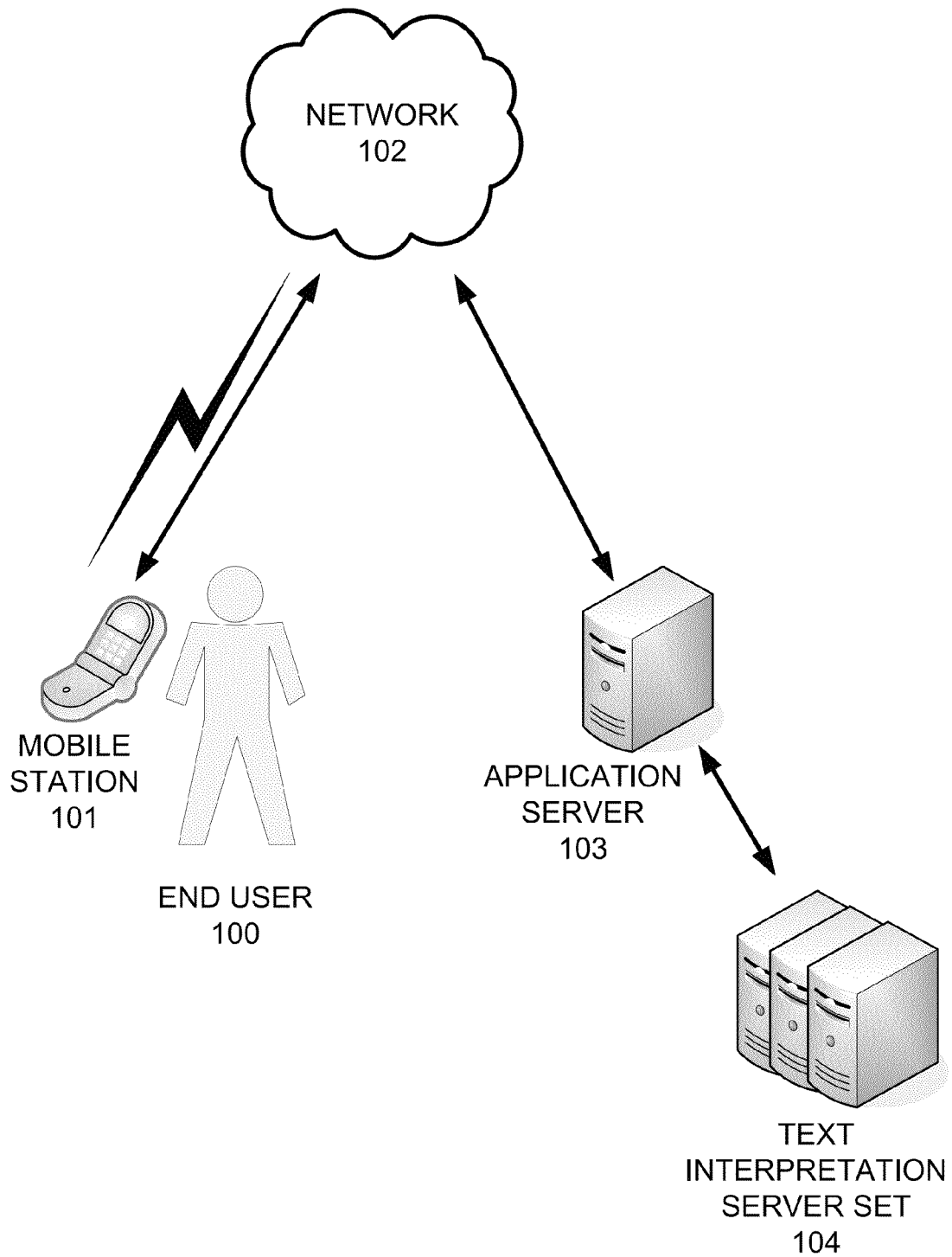
FIG. 1 illustrates an example network configuration according to example embodiments of the present invention

FIG. 1 illustrates an example communication network according to example embodiments of the present invention. Referring to FIG. 1, an end user 100 is operating a mobile station 101 which is communicating wirelessly with a communication network 102, which may be the Internet or a private communication network. On the receiving end of the communication network is an application server 103, which operates to provide an application accessible to the end user via his or her mobile station 101. A text interpretation server or server set of multiple servers 104 provides a text interpretation application or engine that interprets the end user's text messages, and provides the interpreted text to the application server 103.

In operation, the communication network of FIG. 1 processes an inbound text message initiated by the end user 100. The text message may be sent in a free-format without any added software flags, parameters, symbols or other data that may be used to interpret the text and/or designate a particular data field, etc. The text message may be sent across a cellular or wireless communication network 102 to a remote application server 103. Certain text messaging protocols may be used, such as, mobile SMS, MMS, IM, or any other free format text application.

According to one example, a user may enter a text message, such as, "I want to pay my satellite television bill." Prior to entering such an example text command, the user may first initiate a text session by entering a short code or number, email address, IM screen name or other input text message that indicates who the user is so the application server may confirm the user's identity. The user may then enter the free format textual message "I want to pay my satellite television bill" in the same message or in a separate text message, once identifying and/or authorizing credentials have been confirmed.

The end user's text message(s) will be transmitted from the user's mobile station 101 across the network 102. The communication link may include transferring information over communication links, such as, wireless networks (e.g., GSM, CDMA, 3G, 4G, etc.), wireline networks (e.g., landline telephony), Internet, satellite/cable networks, or, any other data medium using standard communication protocols.

According to another example, the text message(s) sent and/or received by the end user 100 may be received and processed by a third party company via an automated application that is setup to receive the messages and process the received information. The third party may provide a service to process and respond to the received text messaging. The third party company and/or other entities setup to receive the message(s), may provide an automated application that will respond to the end user 100 with a textual message (e.g. "confirmation", question, or other message type). The automated application will communicate textually in a turn-taking mode by sending text messages to the user until the necessary information is received.

By offering an automated text messaging application platform, there may be an increased availability of information, services, and/or communication systems that are currently only available via the Internet, live agents or automated phone systems (e.g. DTMF phone dialing, speech recognition, etc.). Not being bound by a computer or voice-based phone session, the end users would have access to such a communication platform anywhere they receive wireless connectivity via their mobile station. The text message interpretation engine 104 may receive the text message and perform normalization to separate keywords from other free-form textual words. These keywords may in turn be used to launch certain services available to the user via his or her text messaging mobile station application.

A normalization procedure may be implemented to reformat the received text. Normalization may format the received text into a format that is recognizable by the text message interpretation engine 104. The normalization procedure may be configured to reformat certain text shortcuts, such as L8=later, lol=laugh out loud, thx=thanks, wanna=want to, want=want to, etc. End users would not be bound by any particular rules of communicating during these text-based automated communication sessions. For instance, the end users can communicate using their normal texting methods and behaviors. The application will receive the text messages and interpret the end user's text message, and thus the user may feel free to text anything they wish to communicate.

According to example embodiments of the present invention, the application will have the ability to "normalize" text strings to compensate for common texting colloquialisms and abbreviations. In addition, the application may derive meaning from the end users text string and react accordingly in an effort to resolve the end user's need. End users 100 would have the ability to contact companies and other entities via free format text sessions. The purpose of these sessions may be to complete a transaction (e.g. pay a bill, order a product, etc.) and/or obtain information using a texting technology exclusively or using some combination of a texting technology, such as, mobile SMS, MMS, IM, or any other free format text application and voice.

In one example, the end user may prefer to pay their satellite service bill that is due on a particular day, but the user is on the road or at a busy international airport. Clearly, the user does not have the time to find a computer terminal, or, does not have easy access to a computer. As a result, the user is unable to use the web to execute this task. Since the user is in a busy international airport, the environment is not conducive to a successful and secure voice transaction. However, the airport does provide phone service that would offer text messaging and other common mobile station communication methods.

The end user would initiate a text messaging session with the application server by entering a short code/number, email address or IM screen name, any of which could identify the user and authenticate his or her credentials. This information may be specific to the user but may also be pre-registered with the user's service providers. For example, when registering for satellite television service, the service provider may ask what the user's preferred password or username should be used to pay their bill via a text messaging application.

According to other example embodiments of the present invention, the end user 100 may initiate a session with the application server 103 by typing a free format text describing their desire to pay their bill. When the end user 100 completes their message, it is sent to the application server 103, which forwards the request to the third party service provider (satellite television provider). Within a matter of minutes, the end user 100 would receive a return message initiated from their satellite provider verifying the identification of the end user 100 and acknowledging the end user's desire to pay their bill. The end user may then respond with a free format text answering the security question authenticating their identity.

The satellite provider system would respond with a message asking the end user 100 if they would like to pay with the credit card on file and if the user would list further identification information, such as, the last four digits of that credit card number. After identifying that the credit card is correct, the end user 100 would send a message identifying that they would like to pay with the credit card on file. The satellite provider would respond with a final message acknowledging the receipt of the payment and would provide the end user 100 with a transaction number thus ending the correspondence.

According to further example embodiments of the present invention, the end user may desire to purchase a product while being away from their personal computer. For example, the user 100 may be in the car or having lunch when they hear their favorite song and would like to order the compact disc (CD) containing this song. The end user may 100 initiate such a transaction by entering the short code for their favorite Internet music outlet. The user may then initiate a free format text outlining their desire to purchase a CD. The end user 100 may not include the name of the CD but may include other information, such as, the song title and artist name. Within a few minutes the end user 100 receives a return message from the music outlet that contains a list of CDs (by the artist mentioned in the original text) that contain the song title the end user noted. The end user 100 responds to the music outlet by texting the name of the CD that they would like to purchase. The music outlet then responds to the end user with a text acknowledging the end users request to order the CD, and in addition asks for billing and shipping information. The end user 100 responds by texting their billing and shipping information to the music outlet. The music outlet responds with a final message summarizing the transaction and providing the end user 100 with a transaction number thus ending this transaction.

Figure 2:
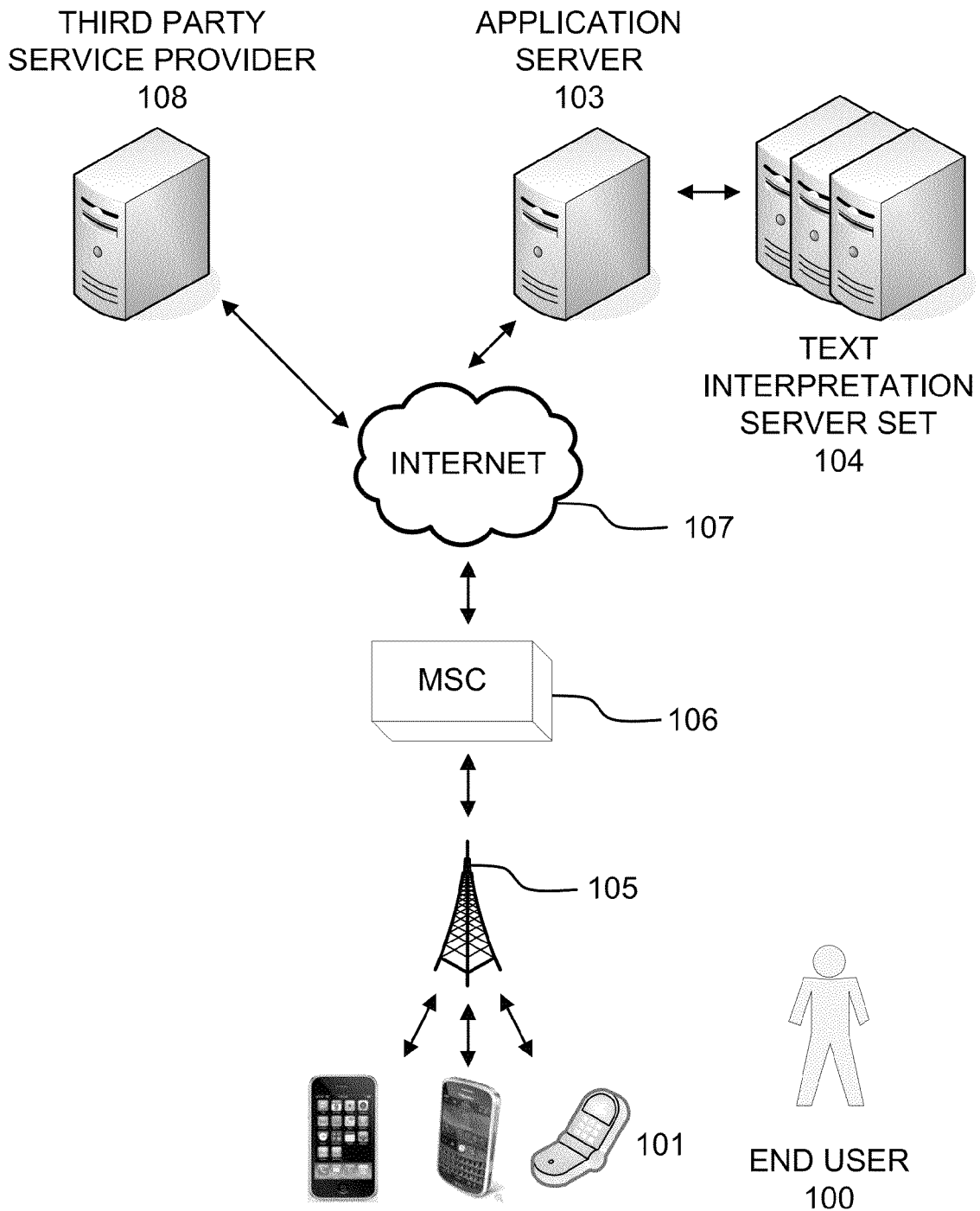
FIG. 2 illustrates another example network configuration according to example embodiments of the present invention.

FIG. 2 illustrates another example network configuration according to example embodiments of the present invention. Referring to FIG. 2, the end user 100 may have access to any mobile station device 101, such as, a cell phone, Blackberry®, Iphone®, or other type of smartphone or communication device. The mobile station 101 may be used to communicate to a base station 105 via a wireless communication signal, which in turn communicates to a regional mobile switching center (MSC) 106. The MSC 106 will relay the text message across the Internet 107 to a text message application server 103, which may forward the text message to a text message interpretation server set 104 so the message may be normalized and processed to interpret the user's free form text information.

In addition to the text application server 103 and the text interpretation server set 104, the third party site server 108 may have its own form of authentication and/or text processing application server. In one scenario, the user's text message may first be forwarded to the third party server 108 to initiate authentication for the user prior to authorizing any services. Once the user is authenticated at the authentication third party service provide server 108, the text messages may then be forwarded across the Internet 107 from the authentication server 108 to the application server 103 and/or to one or more of the text interpretation server set 104. The user's text message may then be processed to determine the user's desired action (i.e., pay bill).

Figure 3:
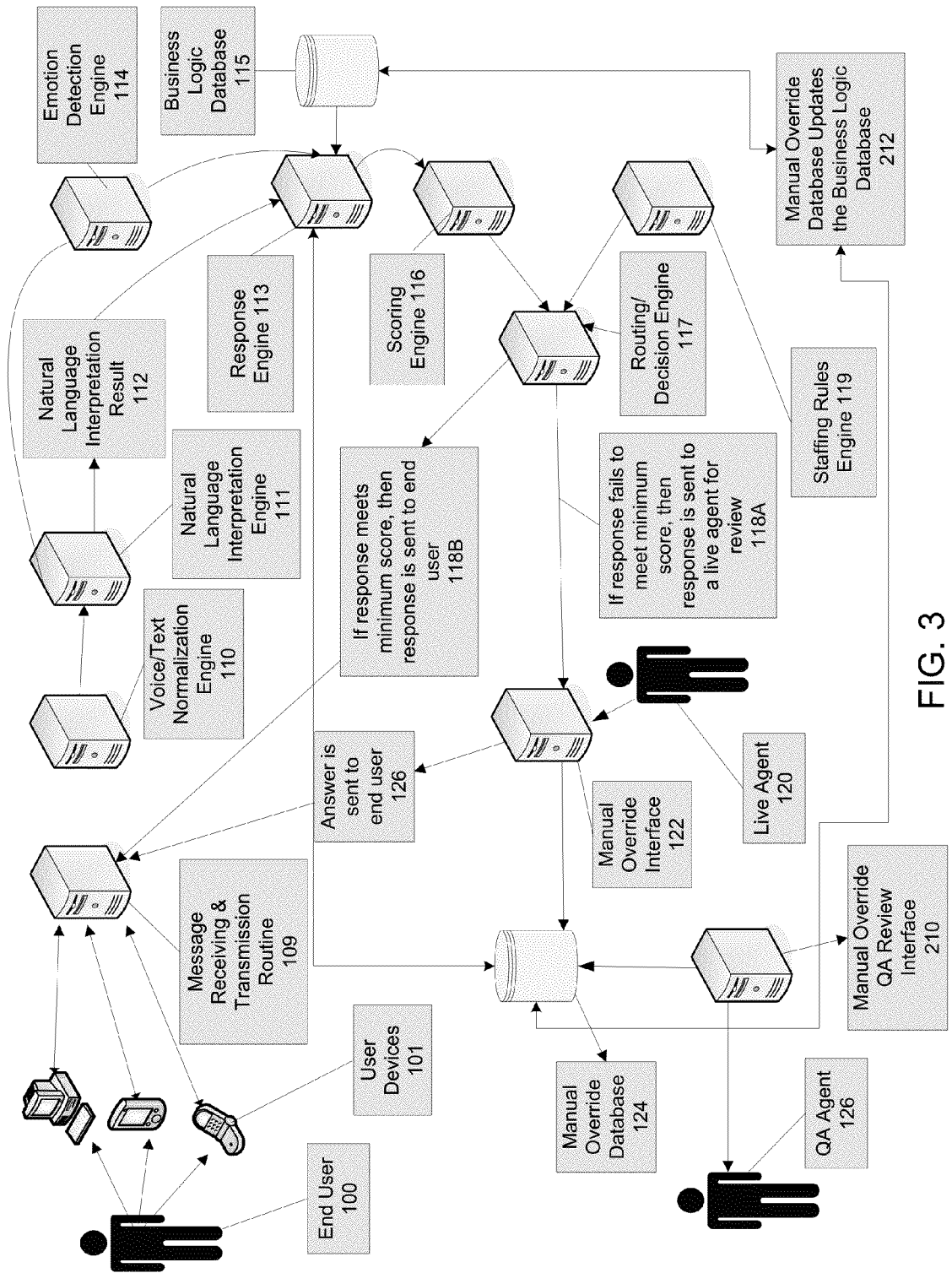
FIG. 3 illustrates the core logic flow of operations within the example communication network, according to example embodiments of the present invention.

FIG. 3 illustrates a communication system according to example embodiments of the present invention. Referring to FIG. 3, an end user 100 operates a user device 101 to communicate across a network to a call center represented by one or more computer server devices and call agents. The user devices 101 may include any computing device, handheld computing device or cellular communication device capable of communicating voice, data, and in particular, a text message.

Messages transmitted and sent from the end user 100 are processed by a message receiving and transmission routine 109. The routine may be part of a larger routine, which is part of a software application operating on a computing platform. It is important to note that all of the computing devices illustrated in FIG. 3 may be consolidated into any number of computing devices that are configured to execute the operations, algorithms and procedures described below. Assuming the message included at least one of spoken words or text, those words can be processed and managed by a natural language (NL) text normalization engine 110.

All incoming contact messages received whether voice, SMS, email or chat, will initially be processed by the voice/text normalization engine 110 which will convert voice to text with the help of statistical language models or convert text messages with acronyms and/or acronyms into standard, normalized text. The normalized text from the previous operation will then be provided into the natural language interpretation engine 111 which will employ robust parsing and one or more classifier methods in order to determine one or more "N" pre-defined results. It is possible that a message contains several different topics. In this example, the natural language interpretation engine 111 will assign multiple results to the message. The result of the interpretation 112 will be forwarded to a response engine 113.

Class-based sub-grammars and name-entity detection algorithms will be applied to fill necessary data elements associated with a given result. For example, if the processed message is about someone wanting to pay $500 to her account, the result would be 'bill pay', and the sub-tag amount=$500. Combined together, the example result might appear as: [Result='bill pay' conf='0.6123', Amount='$500'], where 'conf' indicates the confidence coefficient of the natural language (NL) interpretation engine 111 of having picked the correct result category. This confidence is the confidence of the robust parsing or classifier output.

The normalized message 112 will also be sent to the emotion detection engine 114 in parallel with being sent to the natural language interpretation engine 111. The emotion detection engine 114 will use natural language processing algorithms for emotion detection, such as, looking for occurrence and frequency of emotion related keywords and phrases (e.g., 'disappointed with service', 'complaint', or 'satisfied', 'great service', 'thanks'). The output of the emotion detection engine 114 will produce an emotion status from a predefined set. The size of the predefined set may be implementation specific but will typically be less than 10. A common choice will be 'negative', 'neutral' and 'positive.' Next, the natural language interpretation result 112 may then be forwarded to a response engine 112.

The response engine 113 will interpret the natural language interpretation result 112 by matching the interpretation result type to a set of predefined response templates as well as sentence generation rules. The response templates may, for example, include a predefined email or SMS text templates that include various variables that need to be processed during the response generation process.

The response engine 113 will also take into account the result of the emotion detection engine 114 as well as relevant business logic from a business logic database 115. For example, if the person who sent the message is part of the contact center's database, then the database 115 will look up account information or past contact history for this person. The database 115 has predefined rules regarding which actions to take for different result types and including emotion status combinations. For example, a business rule might provide an offer for a coupon if the message result type='order status' and emotion='negative', (i.e., the message is most likely a complaint about the delayed status of an order).

There will also be response value settings for the case that no matching response rules where found for a given result. In addition to generating the actual response text, the response engine 113 will also calculate a confidence score that describes the response engine's confidence in the response it generated. The score is based on how well the response matches the natural language interpretation result. For example, once the response has been generated, it is passed on to the scoring engine 116. The scoring engine 116 will then combine the confidence score from the interpretation engine 111 and the response engine 113 in order to calculate an overall confidence score that represents the possible correctness of both the original interpretation as well as the generated response.

The text interpretation system may query the current staffing status from the staffing rules engine 119. The staffing engine 119 provides data, such as, the current staffing status (e.g., number of agents online for a particular skill group) and data items, such as, the average hold time and/or queue length. The staffing engine 119 calculates a single staffing status based on all available data elements and combines that information with the message result record. For example, the staffing status values might include 'max automation', 'automated only high conf responses', etc. The set of staffing statuses could also be a simple range of numbers.

Once all automated actions have been completed and all information of the various operations has been encoded in the results record associated with the message, the completed results record may now be passed to the decision/routing engine 117. The decision routing engine 117 checks the overall confidence score of the result and compares it with the staffing status provided from the staffing rules engine 119. A minimum score is looked up and associated with each staffing status. If the response meets the minimum score for the current staffing status, then the auto-generated response is sent directly to the end user at operation 118B. If the overall confidence score is above the minimum threshold score level, then the response is sent to a live agent 120 to review the auto-generated response at operation 118A. Associating a minimum score for each staffing status is that in the case of long hold times, it might be preferable to send out as many automated responses as possible while taking the risks of occasionally sending an incorrect or partially incorrect response. However, if the call center is not busy, it is preferable to have live agents 120 review as many messages as possible.

The live agent 120 will review the response with the help of a manual override interface 122 which in turn is connected to a manual override database 124. If the agent judges the response to be correct, it will then be sent to the end user 100. If the message has errors, the agent 120 will make the necessary corrections. Then, the correct message will be sent to the end user 100. At the same time, the correction information will be stored in the manual override database 124. All messages that are being sent out, both with and without agent review will be saved for review by quality assurance agents (QA agents) 126 via the manual override QA review interface 210.

The responsibility of the QA agents 126 will be to review the correctness of messages that have been sent out to the end user 100 without review by a live agent 120 as well as the messages that were corrected by a live agent 120. The review interface 210 will allow the QA agent 126 to sort the messages by a number of different criteria such as overall confidence score, result type, etc. The QA agent 126 will have the capability to correct all auto-generated messages. These corrections represent corrections to the rules and/or templates in the response engine 113 as well as the business logic database 115, which will be stored in the manual override database 124. In other words, the review agent 120 will view all the rules and templates that were involved in the response creation process in addition to the response that had been created. The corrections will include editing and/or adding to these displayed rules and templates.

On a regular basis, for example, nightly or weekly, the corrected and/or additional rules and templates will be sent to both the response engine 113 as well as the business logic database 115. This process ensures that even after its initial setup, the response engine as well as the Business Logic Database are continually maintained and refined by a feedback loop from the Manual Override QA Review Interface 210. This process can continually add to the human or expert knowledge in both the response engine 113 as well as the business logic database 115 that is required to continuously increase the accuracy of responses over time, as the variability of the incoming messages from the end user is very large and also always changing over time. Additionally, the QA agent 126 also has the ability to update the information in the business logic database 115 and the response engine 113 directly in order to account for changes in business rules, contact center processes, product line-ups, service offerings etc.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of FIGS. 1-3.

Figure 4:
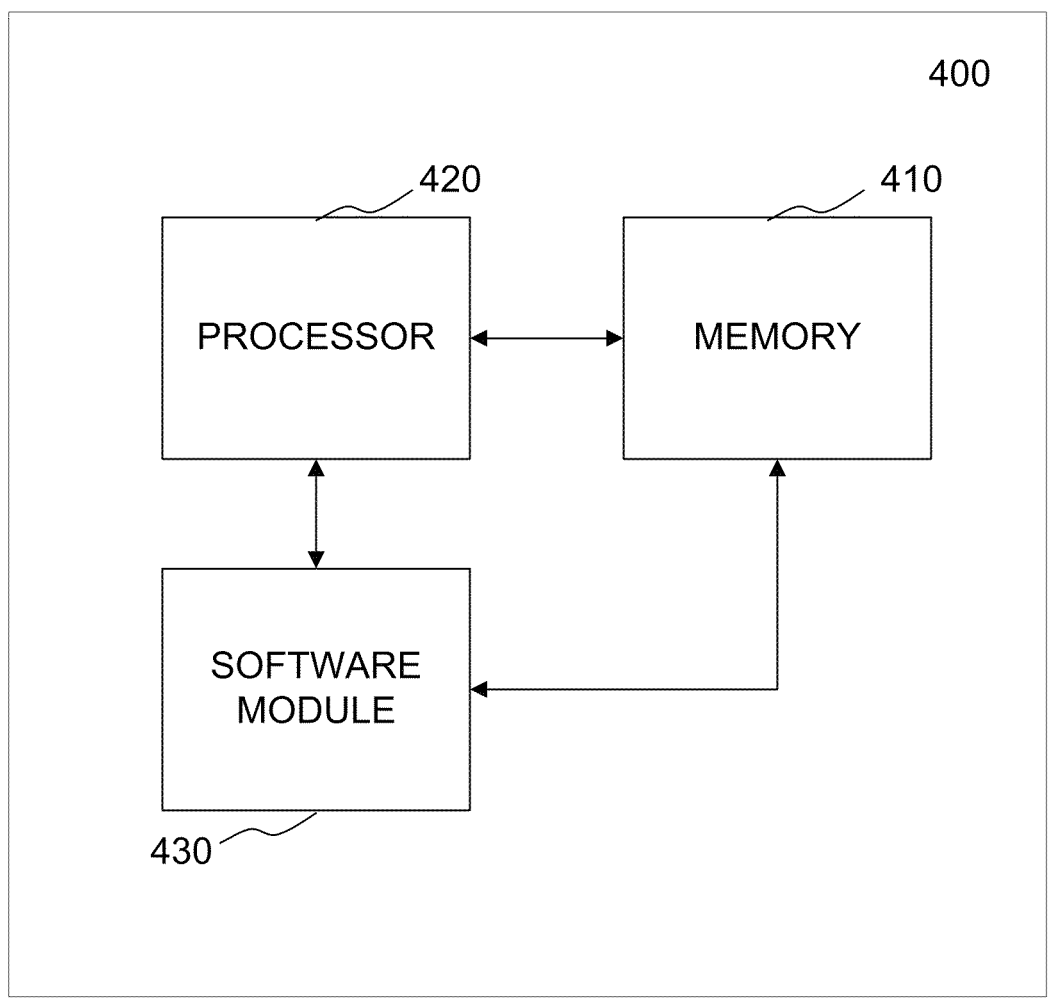
FIG. 4 illustrates a network entity that may include memory, software code and other computer processing hardware, and which may be configured to perform operations according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
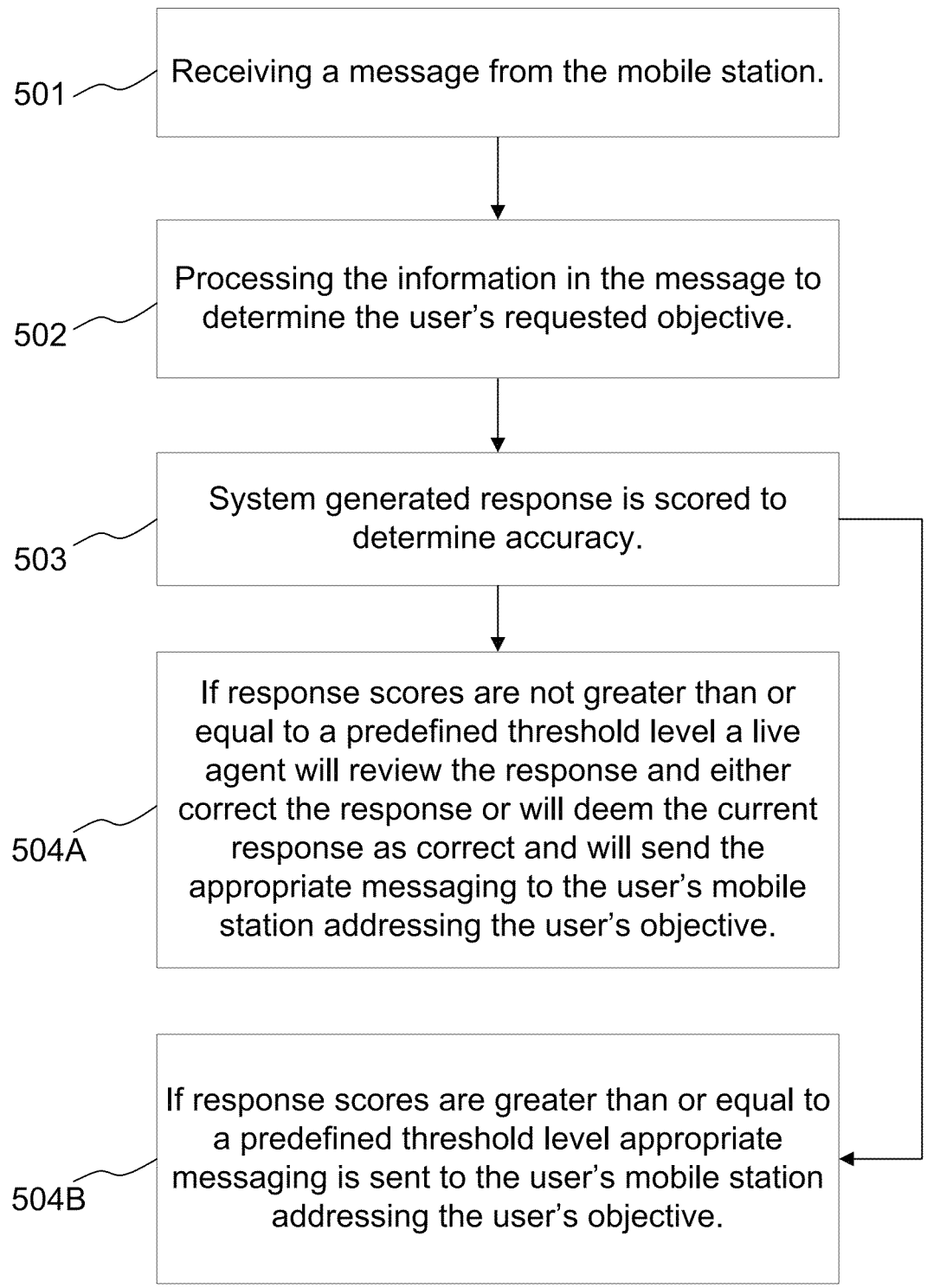
FIG. 5 illustrates a flow diagram of an example method of operation according to example embodiments of the present invention.

One example embodiment of the present invention may include a method of processing communications with a mobile station, as illustrated in the flow diagram of FIG. 5.

The method includes receiving a message from the mobile station, at operation 501 and processing the information in the message to determine the user's requested objective, at operation 502. The system generated response is scored to determine accuracy, at operation 503. If the response scores are not greater than or equal to a predefined threshold level a live agent will review the response and either correct the response or will deem the current response as correct and will send the appropriate messaging to the user's mobile station addressing the user's objective, at operation 504A. If response scores are greater than or equal to a predefined threshold level appropriate messaging is sent to the user's mobile station addressing the user's objective, at operation 504B.

Figure 6:
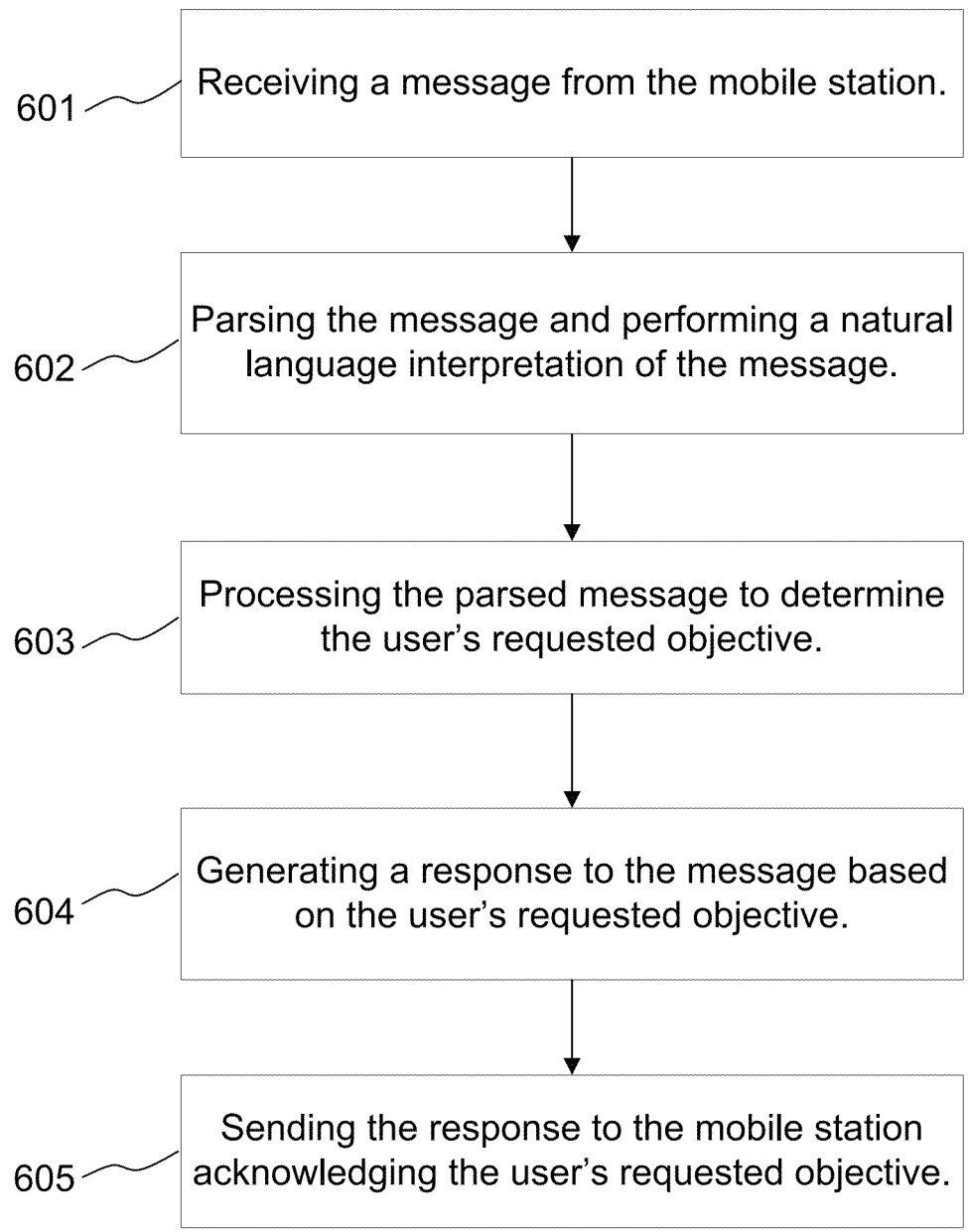
FIG. 6 illustrates a flow diagram of an example method of operation according to other example embodiments of the present invention.

Another example embodiment of the present invention may include a method of processing communications with a mobile station, as illustrated in the flow diagram of FIG. 6. The method may include receiving a message from the mobile station, at operation 601. The method may also include parsing the message and performing a natural language interpretation of the message, at operation 602. The method may further include processing the parsed message to determine the user's requested objective, at operation 603. The method may also include generating a response to the message based on the user's requested objective, at operation 604 and sending the response to the mobile station acknowledging the user's requested objective, at operation 605.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of processing a text message from a mobile station at a third party provider via text messaging, the method comprising:
   receiving the text message from the mobile station via a receiver of a computing device, wherein the text message comprises a transaction request from a user;
   parsing the message, via a processor of the computing device, and performing a natural language interpretation of the message to identify at least one emotion related keyword or phrase included in the message;
   processing the parsed message, via the processor, to determine the user's requested objective from the transaction request;
   assigning an emotion status to the message, via the processor, based on the identified at least one emotion related keyword or phrase;
   generating a response to the message based on the user's requested objective and the assigned emotion status, wherein the response comprises a pre-defined return text message acknowledging the user's requested objective corresponding to the transaction and an incentive based on the assigned emotional status;
   if a confidence of the generated response exceeds a threshold sending the response to the
mobile station, via a transmitter of the computing device, and
   otherwise sending the response to a live agent for correction, sending the corrected response to the mobile station and storing the corrected response as the pre-defined return text message.

2. The method of claim 1, wherein the assigning the emotion status to the message is based on identifying a frequency of occurrences of the at least one emotion related keyword or phrase.

3. The method of claim 1, further comprising confirming the user's requested objective has been fulfilled in the response.

4. The method of claim 1, further comprising authenticating the user by matching user specific information included in the message to pre-stored user specific information stored in a database.

5. The method of claim 1, wherein the message includes an authorization portion and a free format text portion.

6. The method of claim 1, further comprising associating the identified at least one keyword or phrase with the emotion status if a threshold predefined set number of occurrences of the at least one emotion related keyword or phrase is identified.

7. The method of claim 1, wherein the message is normalized to determine words of interest prior to fulfilling the user's requested objective.

8. An apparatus configured to process a text message from a mobile station at a third party provider via text messaging, the apparatus comprising:
   a receiver configured to receive the text message from the mobile station, wherein the text message comprises a transaction request from a user;
   a processor configured to parse the message, perform a natural language interpretation of the message to identify at least one emotion related keyword or phrase included in the message, process the parsed message to determine the user's requested objective from the transaction request and to assign an emotion status to the message based on the identified at least one emotion related keyword or phrase, and generate a response to the message based on the user's requested objective and the assigned emotion status, wherein the response comprises a pre-defined return text message acknowledging the user's requested objective corresponding to the transaction and an incentive based on the assigned emotional status; and
   a transmitter configured to send the response to the mobile station if a confidence of the generated response exceeds a threshold; and
   otherwise send the response to a live agent for correction, send the corrected response to the mobile station and store the corrected response as the pre-defined return text message.

9. The apparatus of claim 8, wherein the assigned emotion status to the message is based on an identification of a frequency of occurrences of the at least one emotion related keyword or phrase.

10. The apparatus of claim 8, wherein the processor is further configured to confirm the user's requested objective has been fulfilled in the response.

11. The apparatus of claim 8, wherein the processor is further configured to authenticate the user by matching user specific information included in the message to pre-stored user specific information stored in a database.

12. The apparatus of claim 8, wherein the message includes an authorization portion and a free format text portion.

13. The apparatus of claim 8, wherein the processor is further configured to associate the identified at least one keyword or phrase with the emotion status if a threshold predefined set number of occurrences of the at least one emotion related keyword or phrase is identified.

14. The apparatus of claim 8, wherein the message is normalized to determine words of interest prior to fulfilling the user's requested objective.

15. A non-transitory computer readable storage medium configured to store instructions that when executed cause a processor to process a text message from a mobile station at a third party provider via text messaging, the processor being further configured to perform:
- receiving the text message from the mobile station, wherein the text message comprises a transaction request from a user;
- parsing the message and performing a natural language interpretation of the message to identify at least one emotion related keyword or phrase included in the message;
- processing the parsed message to determine the user's requested objective from the transaction request;
- assigning an emotion status to the message based on the identified at least one emotion related keyword or phrase;
- generating a response to the message based on the user's requested objective and the assigned emotion status, wherein the response comprises a pre-defined return text message acknowledging the user's requested objective corresponding to the transaction and an incentive based on the assigned emotional status;
- if a confidence of the generated response exceeds a threshold sending the response to the mobile station, via a transmitter of the computing device, and
- otherwise forwarding the response to a live agent for correction, sending the corrected response to the mobile station and storing the corrected response as the pre-defined return text message.

16. The non-transitory computer readable storage medium of claim 15 wherein the assigning the emotion status to the message is based on identifying a frequency of occurrences of the at least one emotion related keyword or phrase.

17. The non-transitory computer readable storage medium of claim 15 wherein the processor is further configured to perform confirming the user's requested objective has been fulfilled in the response.

18. The non-transitory computer readable storage medium of claim 15 wherein the processor is further configured to perform authenticating the user by matching user specific information included in the message to pre-stored user specific information stored in a database.

19. The non-transitory computer readable storage medium of claim 15, wherein the message includes an authorization portion and a free format text portion.

20. The non-transitory computer readable storage medium of claim 15 wherein the processor is further configured to perform associating the identified at least one keyword or phrase with the emotion status if a threshold predefined set number of occurrences of the at least one emotion related keyword or phrase is identified.

* * * * *